United States Patent
LeBlanc et al.

(10) Patent No.: US 9,549,033 B2
(45) Date of Patent: *Jan. 17, 2017

(54) SYSTEM AND METHOD FOR DELIVERING PUSH CONTENT TO A MOBILE DEVICE

(71) Applicant: BlackBerry Limited, Waterloo (CA)

(72) Inventors: Michael LeBlanc, Fredericton (CA); Jody D. Glidden, Miami Beach, FL (US)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/863,949

(22) Filed: Sep. 24, 2015

(65) Prior Publication Data

US 2016/0014225 A1   Jan. 14, 2016

Related U.S. Application Data

(63) Continuation of application No. 12/867,295, filed as application No. PCT/CA2009/000184 on Feb. 13, 2009, now Pat. No. 9,178,954.

(60) Provisional application No. 61/066,058, filed on Feb. 15, 2008.

(51) Int. Cl.
*H04M 3/42* (2006.01)
*H04L 29/08* (2006.01)

(52) U.S. Cl.
CPC ............ *H04L 67/26* (2013.01); *H04L 67/04* (2013.01)

(58) Field of Classification Search
CPC .... H04L 65/4084; H04L 65/602; H04L 65/80; H04L 67/06; H04L 63/062; H04L 63/08; H04L 65/604; H04L 65/4076; H04L 65/60; H04L 9/0891; H04L 29/08981; H04L 63/0876; H04L 63/123; H04L 67/2852; H04L 12/18; H04L 61/2015; H04L 67/02; H04L 12/1859
(Continued)

(56) References Cited

U.S. PATENT DOCUMENTS 7,373,139 B2 * 5/2008 Suzuki .............. G06F 17/30902
455/414.2
7,957,691 B1 * 6/2011 Lee ........................ H04L 67/306
455/3.01
(Continued)

FOREIGN PATENT DOCUMENTS

EP   1429569 A1   6/2004
EP   1523154      4/2005
(Continued)

OTHER PUBLICATIONS

Office Action; CA application No. 2715154; Mar. 4, 2014.
(Continued)

*Primary Examiner* — Nimesh Patel
(74) *Attorney, Agent, or Firm* — Rideout and Maybee LLP

(57) ABSTRACT

A system is provided for delivering push content to a wireless device. The system includes a central storage device, a push content delivery component, and a transfer protocol delivery component. The central storage device stores push content to be delivered to the wireless device. The push content delivery component generates a manifest identification (ID) of content to be delivered to the wireless device and delivers the manifest ID to the wireless device in a communication. The delivery component includes the central storage device and is connected to the push content delivery component. The delivery component delivers the manifest to the wireless device upon receipt of the manifest ID from the wireless device and delivers to the wireless
(Continued)

device the content identified in the manifest upon request from the wireless device.

20 Claims, 6 Drawing Sheets

(58) Field of Classification Search
USPC ..... 455/418, 414.1, 466, 419, 420; 709/217, 709/218, 219, 206
See application file for complete search history.

(56) References Cited

U.S. PATENT DOCUMENTS

| | | | | |
|---|---|---|---|---|
| 8,526,928 | B2* | 9/2013 | LeBlanc | G11B 27/10 455/414.3 |
| 9,178,954 | B2* | 11/2015 | LeBlanc | H04L 67/04 |
| 2004/0156487 | A1* | 8/2004 | Ushiki | H04L 67/18 379/88.22 |
| 2005/0201320 | A1 | 9/2005 | Kiss et al. | |
| 2006/0229065 | A1* | 10/2006 | Lazaridis | G06Q 30/00 455/414.3 |

FOREIGN PATENT DOCUMENTS

| | | |
|---|---|---|
| WO | 2006004466 | 1/2006 |
| WO | 2007062673 A1 | 6/2007 |
| WO | 2008134880 | 11/2008 |

OTHER PUBLICATIONS

Office Action; CA application No. 2715154; Feb. 21, 2013.
EESR; EP application No. 12187998.5; Feb 18, 2013.
EESR; EP application No. 09710480.6; Jul. 14, 2011.

* cited by examiner

SYSTEM AND METHOD FOR DELIVERING PUSH CONTENT TO A MOBILE DEVICE

CROSS REFERENCE TO RELATED APPLICATIONS

The present application is a continuation of U.S. patent application Ser. No. 12/867,295, filed Sep. 20, 2010, which was a national stage entry of International Application No. PCT/CA2009/000184, filed Feb. 13, 2009, which claimed priority to U.S. Provisional Application No. 61/066,058, filed Feb. 15, 2008, all of which are hereby incorporated by reference in their entirety.

TECHNICAL FIELD

The present disclosure relates generally to portable devices, and more particularly to a system and method for delivering push content to a mobile device.

BACKGROUND

Conventional methods currently being used to deliver push content to mobile devices generally include: (a) delivering mobile content to a mobile device through a push delivery infrastructure, not requiring user intervention; (b) pulling mobile content to a mobile device while the user is viewing content, which requires the user to select the content he or she wishes to receive; and (c) having the mobile device periodically poll the server for new mobile content to pull to the mobile device, generally not requiring user intervention.

These conventional methods for delivering content to mobile devices have a number of problems, including: (a) the push delivery infrastructure being limited in its ability to transfer large amounts of content reliably over carrier networks; (b) mobile device users without push delivery infrastructures not being able to receive content deliveries, which requires the users to pull mobile content to the mobile device while browsing, which introduces additional work and latency to the delivery mechanism; and (c) polling for new content by the mobile device causing additional network overhead, which is inefficient.

It would be desirable to have a method for delivering push content to mobile devices that does not waste processing resources or bandwidth in this way, or waste the time of the user of the device.

BRIEF DESCRIPTION OF THE DRAWINGS

Reference will now be made to the drawings, which show by way of example, embodiments of the present disclosure, and in which.

It will be noted that throughout the appended drawings, like features are identified by like reference numerals.

DETAILED DESCRIPTION

One aspect of the description provides a system for delivering push content to a wireless device. The system comprises a central storage device, a push content delivery component, and a transfer protocol delivery component. The central storage device stores push content to be delivered to the wireless device. The push content delivery component generates a manifest identification (ID) of content to be delivered to the wireless device and delivers the manifest ID to the wireless device in a communication. The transfer protocol delivery component connects to the push content delivery component. The transfer protocol delivery component delivers the manifest to the wireless device upon receipt of the manifest ID from the wireless device and delivers to the wireless device the content identified in the manifest upon request from the wireless device.

Another aspect of the description provides a system for managing push content reception on a wireless device. The system comprises a listening component, a handling component, and a delivery manager. The listening component detects an arriving communication, the communication including a manifest identification (ID). The handling component couples to the listening component for processing the communication and requesting and receiving the manifest by providing the manifest ID to a central storage device, where the handling component further saves the manifest, which identifies content to be downloaded by the wireless device. The delivery manager component downloads the content to the wireless device.

Another aspect of the description provides a method for use in an apparatus for delivering push content to a wireless device. The method comprises storing content files to be delivered to the wireless device in a central storage device of the apparatus; generating a request file containing information pertaining to the content files to be delivered to the wireless device; generating a communication to be delivered to the wireless device; sending the communication to the wireless device; and delivering the content files to the wireless device in response to at least one hypertext transfer protocol (HTTP) delivery request from the wireless device for the content files.

Figure 1:
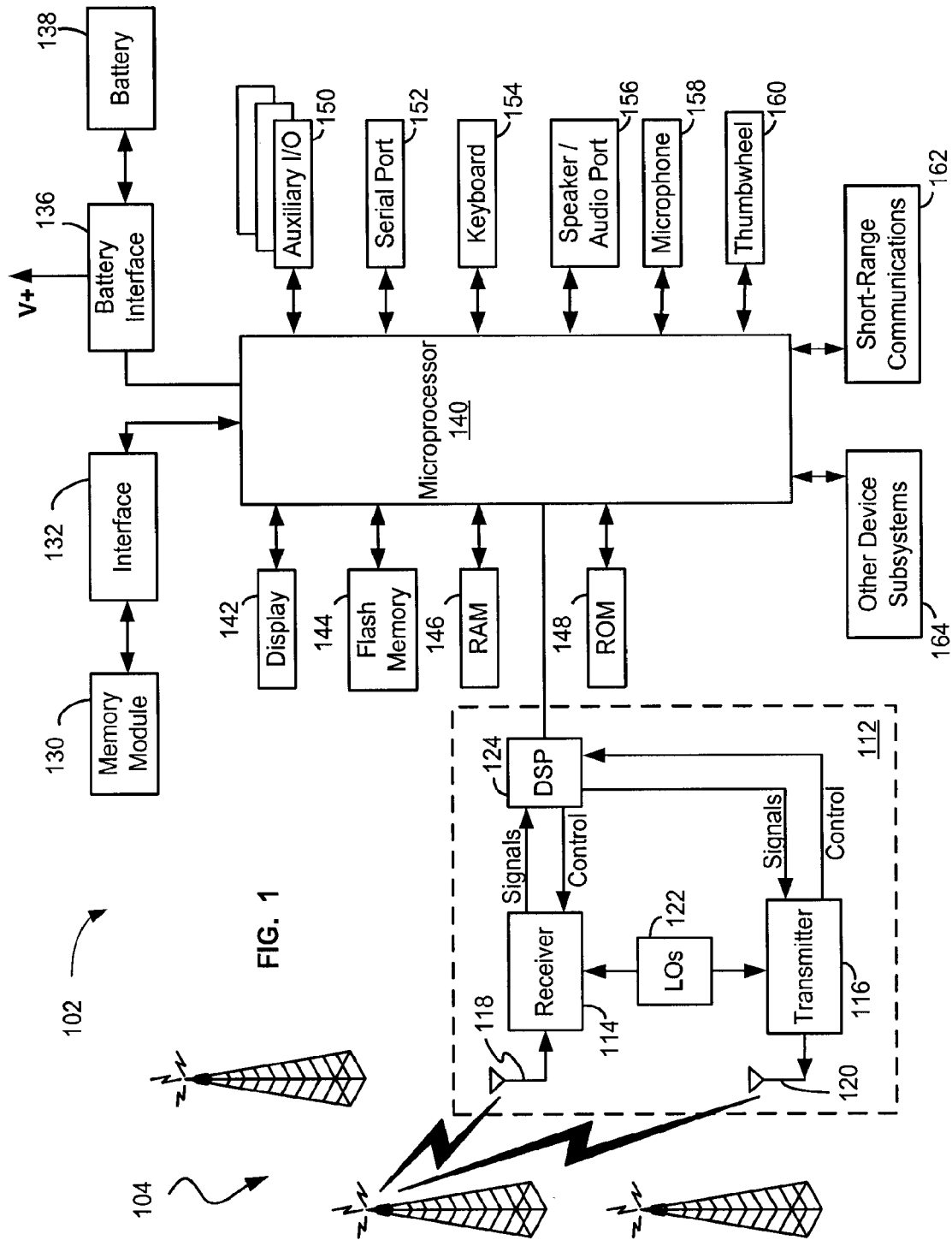
FIG. 1 shows in block diagram form a wireless device suitable for receiving content in accordance with one embodiment.

Reference is first made to FIG. 1, which shows a block diagram illustrating a portable wireless device 102 that is suitable for receiving content in accordance with one aspect of the present disclosure. The wireless device 102 communicates through a wireless communication network 104. The wireless network 104 includes antenna, base stations, and supporting radio equipment as for supporting wireless communications between the wireless device 102 and other devices connected to wireless network 104. The wireless network 104 may be coupled to a wireless network gateway and to a wide area network, shown in FIG. 2.

In one embodiment, the wireless device 102 is a two-way communication device having at least voice and/or data communication capabilities, including the capability to communicate with other computer systems. In one embodiment, the wireless device 102 is a handheld device. Depending on the functionality provided by the wireless device 102, it may be referred to as a data messaging device, a two-way pager, a cellular telephone with data messaging capabilities, a wireless Internet appliance, a data communication device (with or without telephony capabilities), or a portable media or music player. The wireless device 102 may communicate with any one of a plurality of fixed transceiver stations within its geographic coverage area.

The wireless device 102 may incorporate a communication subsystem 112, which includes a receiver 114, a transmitter 116, and associated components, such as one or more antenna elements 118 and 120, local oscillators (LOs) 122, and a processing module such as a digital signal processor (DSP) 124. In one embodiment, the antenna elements 118 and 120 may be embedded or internal to the wireless device 102. As will be apparent to those skilled in the field of communications, the particular design of the communication subsystem 112 depends on the wireless network 104 in which the wireless device 102 is intended to operate.

The wireless device 102 may send and receive communication signals over the wireless network 104 after the required network registration or activation procedures have been completed. Signals received by the antenna 118 through the wireless network 104 are input to the receiver 114, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 124. In a similar manner, signals to be transmitted are processed, including modulation and encoding, for example, by the DSP 124. These DSP-processed signals are input to the transmitter 116 for digital-to-analog (D/A) conversion, frequency up conversion, filtering, amplification, and transmission to the wireless network 104 via the antenna 120. The DSP 124 not only processes communication signals, but also provides for receiver and transmitter control. For example, the gains applied to communication signals in the receiver 114 and the transmitter 116 may be adaptively controlled through automatic gain control algorithms implemented in the DSP 124.

Network access is associated with a subscriber or user of the wireless device 102 via a memory module, such as a memory module 130, which may be a Subscriber Identity Module (SIM) card for use in a GSM network or a USIM card for use in a UMTS. The SIM card is inserted in or connected to an interface 132 of the wireless device 102 in order to operate in conjunction with the wireless network 104. Alternatively, the wireless device 102 may have an integrated identity module for use with systems such as Code Division Multiple Access (CDMA) systems.

The wireless device 102 also includes a battery interface 136 for receiving one or more rechargeable batteries 138. The battery 138 provides electrical power to at least some of the electrical circuitry in the wireless device 102, and the battery interface 136 provides a mechanical and electrical connection for the battery 138. The battery interface 136 is coupled to a regulator (not shown) which provides power V+ to the circuitry of the wireless device 102.

The wireless device 102 includes a microprocessor 140 which controls the overall operation of the wireless device 102. Communication functions, including at least data and voice communications, are performed through the communication subsystem 112. The microprocessor 140 also interacts with additional device subsystems such as a display 142, a flash memory 144, a random access memory (RAM) 146, a read-only memory (ROM) 148, auxiliary input/output (I/O) subsystems 150, a Universal Serial Bus (USB) port 152, a keyboard or keypad 154, a speaker or audio port 156 for connecting to, for example a set of headphones, a microphone 158, a clickable thumbwheel, thumbwheel, or set of scroll buttons 160, a short-range communications subsystem 162, and any other device subsystems generally designated as 164. Some of the subsystems shown in FIG. 1 perform communication-related functions, whereas other subsystems may provide "resident" or on-device functions. Notably, some subsystems, such as the keypad 154, the display 142, and the clickable thumbwheel 160, for example, may be used for both communication-related functions, such as entering a text message for transmission over the wireless network 104, and executing device-resident functions such as a calculator or task list. Operating system software used by the microprocessor 140 is preferably stored in a persistent store such as the flash memory 144, which may alternatively be the ROM 148 or similar storage element. Those skilled in the art will appreciate that the operating system, specific device applications, or parts thereof, may be temporarily loaded into a volatile store such as the RAM 146.

The microprocessor 140, in addition to its operating system functions, enables execution of software applications on the wireless device 102. A predetermined set of applications that control basic device operations, including data and voice communication applications, will normally be installed on the wireless device 102 during or after manufacture. The wireless device 102 may include a personal information manager (PIM) application having the ability to organize and manage data items relating to a user such as, but not limited to, instant messaging, email, calendar events, voice mails, appointments, and task items. One or more memory stores may be available on the wireless device 102 to facilitate storage of information, such as the flash memory 144, the RAM 146, the ROM 148, the memory module 130, or other types of memory storage devices or FLASH memory cards represented by the other device subsystems 164, such as Secure Digital (SD) cards, mini SD cards, micro SD cards, etc.

The PIM and/or media applications have the ability to send and receive data items via either the wireless network 104 or a link to a computer system. The link to the computer system may be via the serial port 152 or the short-range communications subsystem 162. Additional applications may also be loaded onto the wireless device 102 through the wireless network 104, the auxiliary I/O subsystem 150, the serial port 152, the short-range communications subsystem 162, or any other suitable subsystem 164, and installed by a user in the RAM 146 or a non-volatile store such as the ROM 148 for execution by the microprocessor 140. Such flexibility in application installation increases the functionality of the wireless device 102 and may provide enhanced on-device functions, communication-related functions, or both. For example, secure communication applications may enable electronic commerce functions and other such financial transactions to be performed using the wireless device 102.

In a data communication mode, a received data signal representing information such as a text message, an email message, a media file to be transferred, or Web page download will be processed by the communication subsystem 112 and input to the microprocessor 140. The microprocessor 140 will further process the signal for output to the display 142 or alternatively to the auxiliary I/O device 150. A user of the wireless device 102 may also compose data items, such as email messages, for example, using the keypad 154 and/or the clickable thumbwheel 160 in conjunction with the display 142 and possibly the auxiliary I/O device 150. The keypad 154 may be either a complete alphanumeric keypad or telephone-type keypad.

For voice communications, the overall operation of the wireless device 102 is similar, except that the received signals would be output to the speaker or audio port 156 and signals for transmission would be generated by a transducer such as the microphone 158. Alternative voice or audio I/O subsystems, such as a voice message recording subsystem, may also be implemented on the wireless device 102. Although voice or audio signal output is typically accomplished primarily through the speaker or audio port 156, the display 142 may also be used to provide an indication of the identity of a calling party, duration of a voice call, or other voice call related information. Stereo headphones may also be used in place of the speaker 156.

The serial port 152 is normally implemented in a personal digital assistant (PDA) type communication device for which synchronization with a user's computer is a desirable, albeit optional, component. The serial port 152 enables a user to set preferences through an external device or software application and extends the capabilities of the wireless device 102 by providing for information, media file, or software downloads to the wireless device 102 other than through the wireless network 104.

The short-range communications subsystem 162 is an additional optional component which provides for communication between the wireless device 102 and different systems or devices, which need not necessarily be similar devices. For example, the subsystem 162 may include an infrared device and associated circuits and components, or a wireless bus protocol compliant communication mechanism such as a Bluetooth™ communication module to provide for communication with similarly-enabled systems and devices (Bluetooth™ is a registered trademark of Bluetooth SIG, Inc.). In another embodiment, the short-range communications subsystem 162 may be a wireless networking communications subsystem, conforming to IEEE 802.11 standards such as 802.11b, 802.11g, and/or 802.11n.

Figure 2:
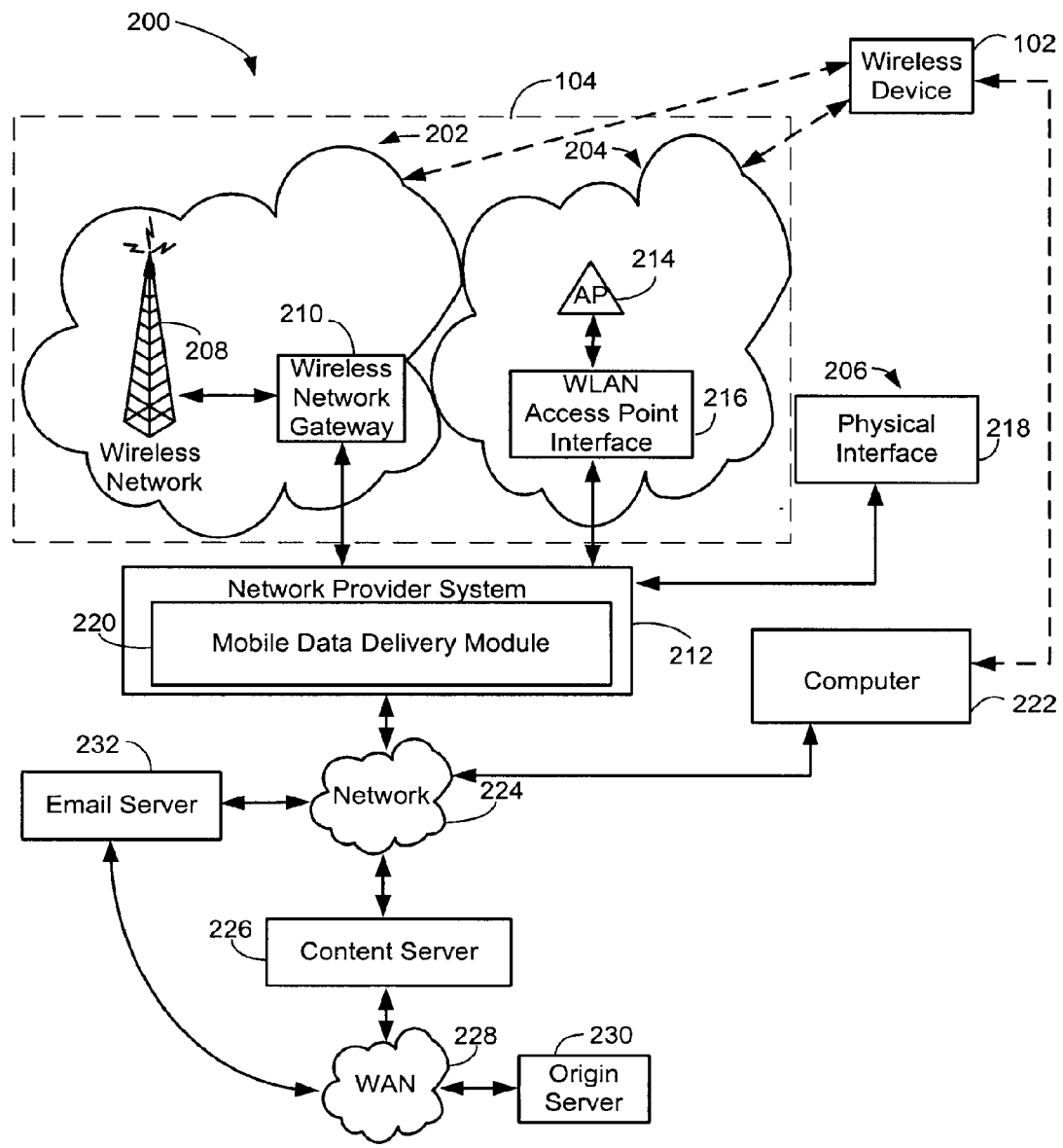
FIG. 2 shows in block diagram form a communication system suitable for providing the operating environment of the wireless device of FIG. 1 in accordance with one embodiment.

Reference is next made to FIG. 2, which shows a communication system 200 suitable for use with the wireless device 102 shown in FIG. 1. The communication system 200 generally includes one or more wireless devices 102 (only one of which is shown in FIG. 2) and the wireless network 104. The wireless network 104 may include a wireless Wide Area Network (WAN) 202, a Wireless Local Area Network (WLAN) 204, and/or other interfaces 206 (which may not necessarily be wireless).

Referring to FIG. 2, the wireless WAN 202 may be implemented as a packet-based cellular or mobile network that includes a number of base stations 208 (one of which is shown in FIG. 2) where each of the base stations 208 provides wireless Radio Frequency (RF) coverage to a corresponding area or cell. The wireless WAN 202 is typically operated by a cellular network service provider that sells subscription packages to users of the wireless devices 102. The wireless WAN 202 comprises a number of different types of networks, for example, Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network) or various other third generation networks such as EDGE (Enhanced Data rates for GSM Evolution), UMTS (Universal Mobile Telecommunications Systems), Third Generation Partnership Project (3GPP or 3G), or Evolution-Data Optimized (EV-DO).

As shown in FIG. 2, the communications system 200 also includes a wireless network gateway 210 and one or more network provider systems 212. The wireless network gateway 210 provides translation and routing services between the network provider system(s) 212 and the WAN 202, which facilitates communication between the wireless devices 102 and other devices (not shown) connected, directly or indirectly, to the network provider system 212.

The WLAN 204 comprises a network which in some examples conforms to IEEE 802.11 standards such as 802.11b, 802.11g, and/or 802.11n; however, other communications protocols may also be used for the WLAN 204. The WLAN 204 includes one or more wireless RF Access Points (AP) 214 (one of which is shown in FIG. 2) that collectively provide a WLAN coverage area. For the embodiment depicted in FIG. 2, the WLAN 204 is operated by an enterprise (for example, a business or university in a building or campus type environment) and the access points 214 are connected to an access point (AP) interface 216. The AP interface 216 provides translation and routing services between the access points 214 and the network provider system 212 to facilitate communication between two or more of the wireless devices 102 and other devices (e.g., such as desktop computers) connected, directly or indirectly, to the network provider system 212. The AP interface 216 is implemented using a computer, for example, a server running a suitable computer program or software.

According to one embodiment, the other interfaces 206 may be implemented using a physical interface indicated by reference 218. The physical interface 218 includes an Ethernet, Universal Serial Bus (USB), Firewire, or infrared (IR) connection implemented to exchange information between the network provider system 212 and the wireless device 102.

The network provider system 212 comprises a server or server modules or a number of servers or server modules which are typically located behind a firewall (not shown). The network provider system 212 may include a number of modules including a mobile data delivery module 220. Various modules running on the network provider system 212 may be implemented as a number of services running on a single server or as a number of interconnected servers each running a software program to implement the functionality of the respective module. The network provider system 212 provides access for the wireless devices 102, through either the wireless WAN 202, the WLAN 204, or the other connection 206 to the devices connected, for example, through an enterprise network 224 (e.g., an intranet), to the network provider system 212. In one embodiment, the data delivery module 220 is implemented on a computer, such as the network provider system 212.

The enterprise network 224 comprises a local area network, an intranet, the Internet, a direct connection, or combinations thereof. The enterprise network 224 may comprise an intranet for a corporation or other type of organization. In at least some embodiments, the network provider system 212 is part of the enterprise network 224, and is located behind a corporate firewall and connected to the wireless network gateway 210 through the Internet. A computer 222 (e.g., a desktop or laptop computer) belonging to the user of the wireless device 102 is typically connected to the enterprise network 224. As described earlier, the wireless device 102 may be temporarily and directly connected to the computer 222 using, for example, the serial port 152. This direct connection may make use of a cradle or docking station connected to a serial port of the computer 222, where the mobile device 102 is placed in the cradle, therefore completing the serial connection between the mobile device 102 and the computer 222. Alternatively, the wireless device 102 may communicate with the computer 222 using the communication subsystem 112 and the WAN 202 and/or the short-range communications subsystem 162 and the WLAN 204.

As shown in FIG. 2, an application/content server 226 may be connected to the enterprise network 224 and also to another network, for example a Wide Area Network (WAN) 228. In some embodiments, an email server 232 and/or the content server 226 form part of the enterprise network 224. The WAN 228 may further connect to other networks. The WAN 228 may comprise or be configured with the Internet, a direct connection, a LAN, a wireless communication link, or any combination thereof. Content providers, such as Web servers, may be connected to the WAN 228, an example of which is shown in FIG. 2 as an origin server 230.

According to one embodiment, the mobile data delivery module 220 provides connectivity between the wireless WAN 202 and the WLAN 204 and the other connection 206 and devices and/or networks connected directly or indirectly to the network provider system 212. In one embodiment, the connectivity provided may be Hypertext Transfer Protocol (HTTP) based connectivity providing an Internet based service connection to devices connected to the wireless WAN 202, the WLAN 204, or the other connection 206 and devices and/or networks connected directly or indirectly to the network provider system 212. The network 224, the application/content server 226, the WAN 228, and the origin server 230, are individually and/or collectively in various combinations a content source for the network provider system 212. It will be appreciated that the system shown in FIG. 2 comprises but one possible communication network or configuration of a multitude of possible configurations for use with the wireless devices 102.

Figure 3:
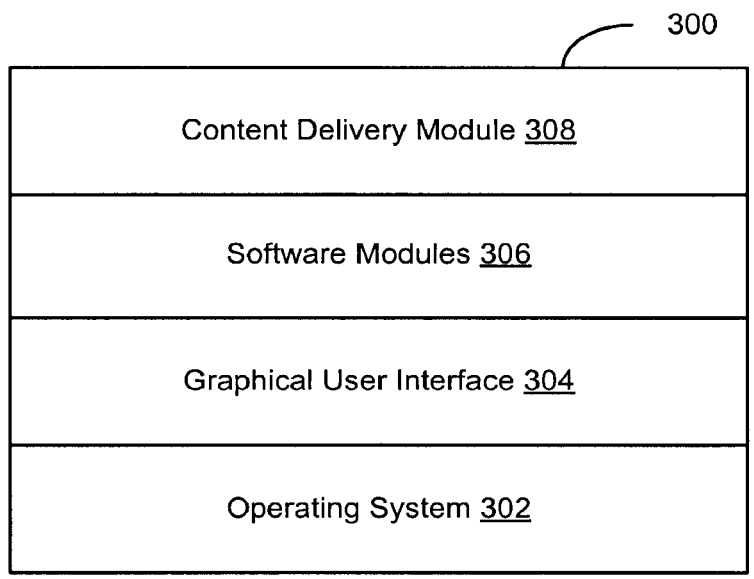
FIG. 3 shows in block diagram form the contents of a memory of the wireless device of FIG. 1.

Reference is next made to FIG. 3, which shows a block diagram illustrating a memory 300 of the wireless device 102. The memory 300 has various software components for controlling the wireless device 102 and may include, for example, the flash memory 144, the RAM 146, the ROM 148, the memory module 130 and/or the other device subsystems 164. In accordance with one embodiment, the wireless device 102 is intended to be a multi-tasking wireless communications device configured for sending and receiving data items and for making and receiving voice calls that also includes various applications enabling users to listen to music, watch video files, play games, view picture files, surf the internet wirelessly, etc. To provide a user-friendly environment to control the operation of the wireless device 102, an operating system (OS) 302 resident on the wireless device 102 provides a basic set of operations for supporting various applications typically operable through a graphical user interface (GUI) 304. For example, the operating system 302 provides basic input/output system features to obtain input from the auxiliary I/O 150, the keypad 154, the clickable thumbwheel 160, and other input devices, and to facilitate output to the user via the display 142. The GUI 304 is typically a component of the operating system 302. One or more software modules 306 for managing communications or providing a personal digital assistant (PDA) or other functions may also be included. The memory 300 also includes an email and calendar client, which may be combined in, for example, a PIM application having email-based calendaring and scheduling functions. Typically, the PIM is installed as one of the software modules 306.

The memory 300 also includes a content delivery module 308. In one example, the content delivery module 308 may be integrated into the operating system 302. Alternatively, the module 308 may be a separate software component, as illustrated in FIG. 3. The content delivery module 308 may be responsible for managing content delivery from the perspective of the wireless device 102. Operation of the content delivery module will be described in more detail below, in connection with FIGS. 5 and 6.

Thus, the wireless device 102 includes computer executable programmed instructions for directing the wireless device 102 to implement various applications. The programmed instructions may be embodied in the one or more software modules 306 resident in the memory 300 of the wireless device 102. Alternatively, the programmed instructions may be tangibly embodied or stored on a computer readable medium (such as a DVD, CD, floppy disk or other storage media) which may be used for transporting the programmed instructions to the memory 300 of the wireless device 102. Alternatively, the programmed instructions may be embedded or carried in a computer-readable, signal-bearing medium that is uploaded to the wireless network 104 by a vendor or supplier of the programmed instructions, and this signal-bearing medium may be downloaded through one or more of the interfaces 112, 150, 152, 162 to the wireless device 102 from, for example, the wireless network 104 by end users.

Figure 4:
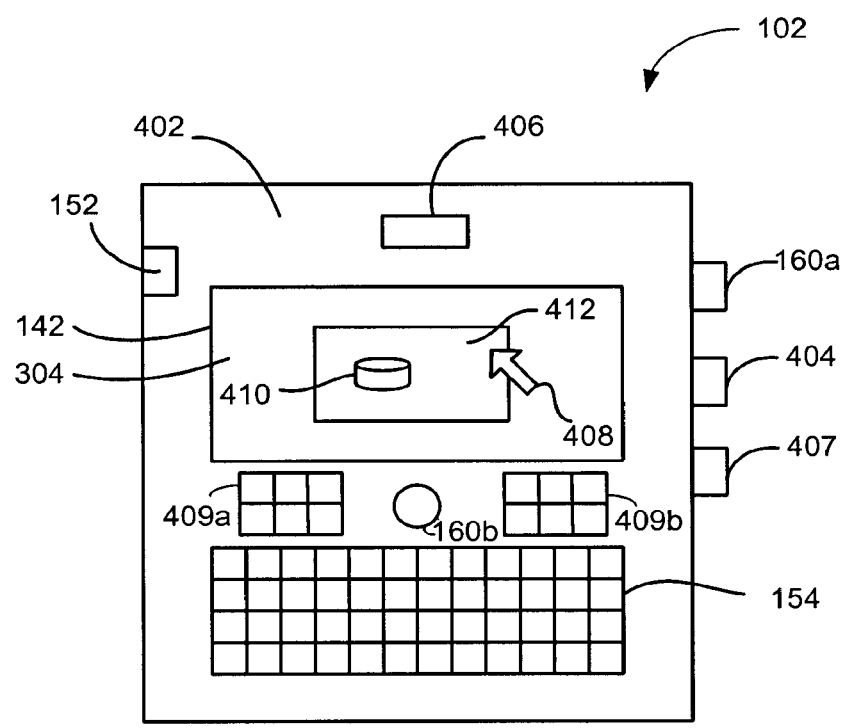
FIG. 4 is a front view illustrating the wireless device of FIG. 1.

Reference is next made to FIG. 4, which shows a front view of the wireless device 102. As mentioned above, the wireless device 102 may be a data and voice-enabled handheld device. The wireless device 102 includes a casing 402, the data or serial port 152, the display screen 142, the graphical user interface (GUI) 304, the keypad 154, the clickable thumbwheel or scroll buttons 160a or other device for navigation such as a trackball 160b, one or more input buttons 404 (e.g., select, cancel, talk, play, stop, fast forward, rewind, next, previous buttons), signal inputs/outputs 406 (e.g., direct wire connection or inductive coupling power connector input, microphone, speaker, data interface input, etc.), and an audio port 407. Additionally, the wireless device 102 may have a number of navigation control buttons represented by numerals 409a and 409b. The navigation control buttons 409 may provide a number of functions such as a send and/or end key for a mobile telephone application of the wireless device 102, a menu key, an escape key, etc. The functions of the navigation control buttons 409 may be user configurable. Internally, the wireless device 102 includes one or more circuit boards (not shown), the microprocessor 140 (FIG. 1), the memory 300 (FIG. 3), the battery 138 (FIG. 1), the antennae 118, 120 (FIG. 1), etc., which may all be coupled to the signal inputs/outputs 406, the keypad 154, the display screen 142, the clickable thumbwheel 160, etc.

The microprocessor 140 is typically coupled to one or more input devices (e.g., the buttons 404, the keypad 154, the clickable thumbwheel 160a, the trackball 160b) for receiving user commands or queries and the display 142 for displaying the results of these commands or queries. For example, user queries may be transformed into a combination of commands for producing one or more tables of output data which may be incorporated in one or more display pages for presentation to the user. The microprocessor 140 is also coupled to the memory 300.

A user may interact with the wireless device 102 and its software modules 306 using the GUI 304. The GUI 304 is controlled by the operating system 302 (FIG. 3) and provides a display format enabling the user to choose commands, execute application programs, manage computer files, and perform other functions by selecting pictorial representations (i.e., icons), or selecting items from a menu through the use of an input or pointing device such as the clickable thumbwheel 160 and/or the keypad 154. Generally, the GUI 304 is used to convey information and receive commands from users and generally includes a variety of GUI objects or controls including icons, toolbars, drop-down menus, pop-up menus, text, dialog boxes, buttons, etc. A user typically interacts with the GUI 304 presented on the display 142 by using an input or pointing device to position a pointer or cursor 408 over an object 410 (i.e., "pointing" at the object) and by "clicking" on the object 410 (e.g., by depressing the thumbwheel 160 or a button on the keyboard 154, etc.). This is often referred to as a point-and-click or selection operation. Typically, the object 410 may be highlighted (e.g., shaded) when it is selected or pointed at by the pointer or cursor 408 to indicate that the object 410 is selectable.

Typically, a GUI-based system presents application, status, and other information to the user in windows appearing on the display 142. A window 412 is a display area shown within the display 142, typically rectangular, in which a user may view an application or document. The window 412 may be open, closed, displayed full screen, reduced to an icon, increased or reduced in size, or moved to different areas of the display 142. Multiple windows 412 may be displayed simultaneously. For example, the windows 412 may be displayed within other windows, overlapped with other windows, or tiled within the display area.

One aspect of the present disclosure provides for the delivery of mobile push content to wireless devices without a connection to a push delivery infrastructure, which may include large asset files as described in the co-pending PCT patent application no. PCT/CA2008/002274 entitled "A Method and System for the Delivery of Large Content Assets to a Smartphone over a Mobile Network", the entirety of which is hereby incorporated by reference. One aspect of the present disclosure allows users to receive content that exceeds the maximum size limit imposed by conventional mobile push data services. Conventional push delivery architectures have limitations of being resource intensive and lacking reliability because they store the content to be delivered on a central server and then try for a limited period of time to deliver the push content to the wireless devices. Since the delivery of push content is managed by a central server, the central server makes decisions such as when the attempts to deliver the content will be made, what happens in the event that the destination wireless device is not accessible, what happens in the event that a transfer is interrupted, etc., which is problematic. Having a central server make these decisions and manage this process is especially problematic when very large (e.g., 20 MB, 50 MB, or even larger) files are to be delivered, because the delivery is likely to take much time and/or be interrupted.

One aspect of the present disclosure does not require the wireless device to poll the central server for new mobile content. Rather, the content is automatically delivered to the wireless device without any user intervention.

One aspect of the present disclosure provides a method for alerting the wireless device through an e-mail message that mobile push content is available that the wireless device needs to retrieve. When the e-mail request is sent to the wireless device, the request is read, processed, and then deleted by the wireless device before the user can read it. Therefore, initiation of content delivery is transparent to the user (e.g., a user does not have to take any action for delivery). Rather, the actual delivery of the wireless push content is triggered by the e-mail message, which enables the wireless device to manage retrieval of the content in a more efficient way. To a user of the wireless device, it appears that content has been automatically delivered to the wireless device. According to the present disclosure, while content delivery is automatic, responsibility for the delivery is shifted to the wireless device itself and away from the central server by enabling the wireless device to retrieve the push content and manage problems such as unavailability of wireless service for a period of time, or interrupted content transfers. Alternatively, another aspect of the present disclosure provides a method for alerting the wireless device through an SMS and/or MMS message that mobile push content is available that the wireless device needs to retrieve.

Figure 5:
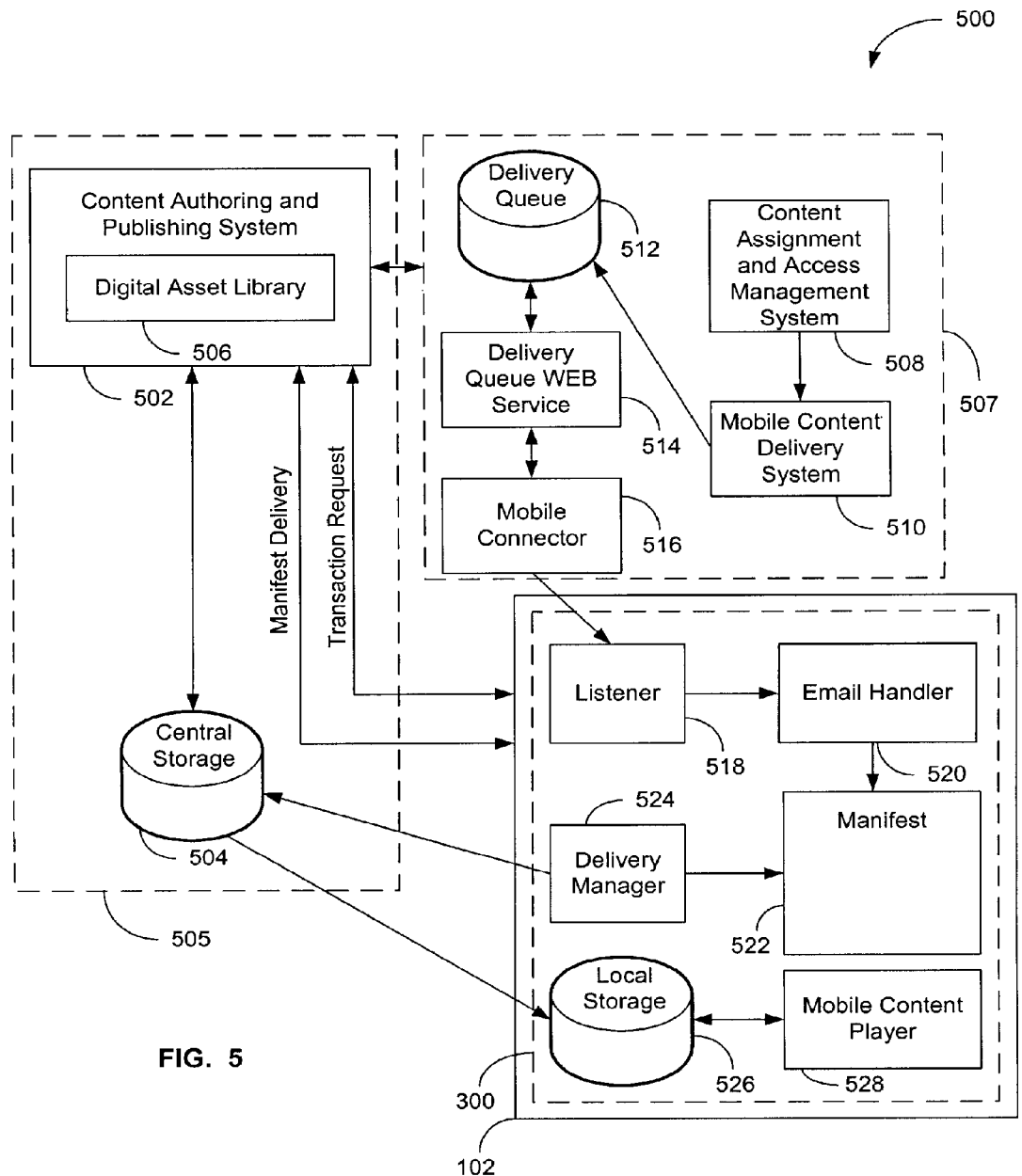
FIG. 5 shows in simplified block diagram form the communications system of FIG. 2 and the wireless device of FIG. 1 configured to deliver push content to the wireless device in accordance with one embodiment.

Reference is next made to FIG. 5, which shows in simplified block diagram form the communications system of FIG. 2 and the wireless device of FIG. 1, represented as a system 500, configured to deliver push content to the wireless device in accordance with one embodiment. The system 500 generally includes a delivery component 505, a push content delivery component 507, and the wireless device 102. In one example, the delivery component 505 may be a hypertext transfer protocol (HTTP) delivery component. In another example, the delivery protocol may be any wireless network based protocol such as a TCP/IP based protocol.

With reference to FIG. 5, the hypertext transfer protocol (HTTP) delivery component 505 may include a content authoring and publishing system 502, a central storage device 504, and a digital asset library 506. An author may use the content authoring and publishing system 502 to create, publish, and/or centrally store in the central storage 504 new content formatted for the wireless devices 102. In another example, content may be taken from the existing digital asset library 506 or created in an application such as a slideshow or presentation application add-in and sent to the content authoring and publishing system 502 as described in a co-pending PCT patent application no. PCT/CA2008/002275 entitled "A Method and System for Authoring Mobile Content in a Slideshow or Presentation Application for Direct Delivery to a Mobile Device", which is hereby incorporated by reference in its entirety.

Content may, in one example, be described as one or more media types that when combined create a document or a content package. This package may include text, images, video, and/or audio. When content is created or existing, the wireless device 102 may be provided with enough information to retrieve the content by the push content delivery component 507. The push content delivery component 507 generally includes a content assignment and access management system 508, a mobile content delivery system 510, a delivery queue 512, a delivery queue web service 514, and a mobile connector 516. The push content delivery component 507 may provide for content to be assigned to users for consumption using the content assignment and access management system 508. The content assignment and access management system 508 may make a request to the mobile content delivery system 510 to send the content to the wireless device 102. This request may contain details for the content delivery, including asset location or address (e.g., HTTP address) and target wireless device information, a manifest ID (e.g., a URL pointing to a manifest) describing an identification of a manifest to be downloaded that contains information related to which files the wireless device should retrieve and where the files are located, and the delivery method for these files. The content assignment and access management system 508 and/or the mobile content delivery system 510 may store the manifest that will be downloaded by the wireless device 102 at a later point in time in the central storage 504. In one example, the delivery method for the details for delivery (e.g., the ID identifying the manifest to be downloaded) may be sent using an e-mail. Alternatively, the delivery method for the details for delivery may be delivered to the destination wireless device 102 using a conventional push infrastructure, after which the wireless device uses other means to retrieve the needed files. In another example, the manifest itself may be sent using the delivery method.

The mobile content delivery system may place a request on the delivery queue 512. In one example, the request may be for delivery from an enterprise server such as the content server 226 (FIG. 2). In another example, the request may be for delivery by e-mail, such as from the email server 232.

The mobile connector 516 may use the delivery queue web service 514 to retrieve the queued item. If the queued item is for email delivery, the mobile connector 516 may create an e-mail that contains the target wireless device and delivery information and a manifest ID. The e-mail is then sent to the target wireless device 102. In one example, the e-mail may be encrypted for security purposes, for example using the 192-bit Triple DES algorithm. Alternatively, any known encryption method or yet to be developed encryption methods may be used, or no encryption may be used.

On the wireless device 102, a listening component 518 listens for or detects the request sent by the mobile connector 516. If the request is for email delivery, the wireless device 102 processes the email using an email handling component 520. The wireless device email handling component 520 may decrypt the contents of the email that contains manifest ID and the instructions for retrieving the content manifest, read the email information into the memory 300, and then delete the email from the wireless device 102 inbox. The email handling component 520 may use the information stored in the memory 300 to make an HTTP request to the HTTP delivery component 505 requesting the content manifest by providing to the component 505 the manifest ID with the email for the wireless device 102 encrypted in the header. In another example, an alternate unique identifier such as a PIN number may be used in place of the email for the wireless device 102. If the component 505 determines that the wireless device email is valid, the component 505 may send the manifest to the wireless device 102 through its HTTP response, and the wireless device 102 may store the manifest, as shown by manifest 522. In one example, the manifest 522 may be an XML manifest. In another example, a manifest queue may be used on the wireless device 102 and may store multiple manifest files 522 and the delivery manager component 524 may pull from this queue in order to retrieve manifests.

The wireless device 102 may further have a delivery manager component 524 that processes the manifest file 522 by retrieving each item specified in the manifest 522 from, for example, the central storage 504. These items may be placed in the wireless device local storage device 526, which may include the memory 300 and/or any of the flash memory 144, the RAM 146, the ROM 148, the memory module 130, or other types of memory storage devices or FLASH memory cards represented by the other device subsystems 164. When all of the content has been delivered to the local storage 526 on the wireless device 102, it is available to be rendered to the user by any of the applications 306 on the wireless device 102, such as a mobile content player 528.

The system 500 may be used to deliver mobile content to the wireless devices 102 both inside and outside of the device's corporate enterprise. Possible applications include training systems where courses are delivered to wireless devices and/or groups of devices, news readers through an RSS feed, sending video and audio files, sending applications and data files to the wireless device, podcast subscriptions, just-in-time corporate communications such as newsletters, announcements, and advertisements, and extended enterprise implementations including customers who require content delivery for partners or customers outside their corporate enterprise and financial institutions who wish to send market research to their customers.

While the components 505 and 507 are represented as distinct components and have a number of sub-components, any of these components or subcomponents may be implemented as modules running on a number of interconnected servers or on a single server, depending on the design criteria of a particular application. For example, any of the components 502, 504, 505, 506, 507, 508, 510, 512, 514, and 516 may be implemented on any of the network provider system 212, the network 224, the content server 226, the email server 232, or the origin server 230. Alternatively, in one example, the components 502, 504, 505, 506, 507, 508, 510, 512, 514, and 516 may be implemented on a single one of the network provider system 212, the network 224, the content server 226, the email server 232, or the origin server 230.

Figure 6:
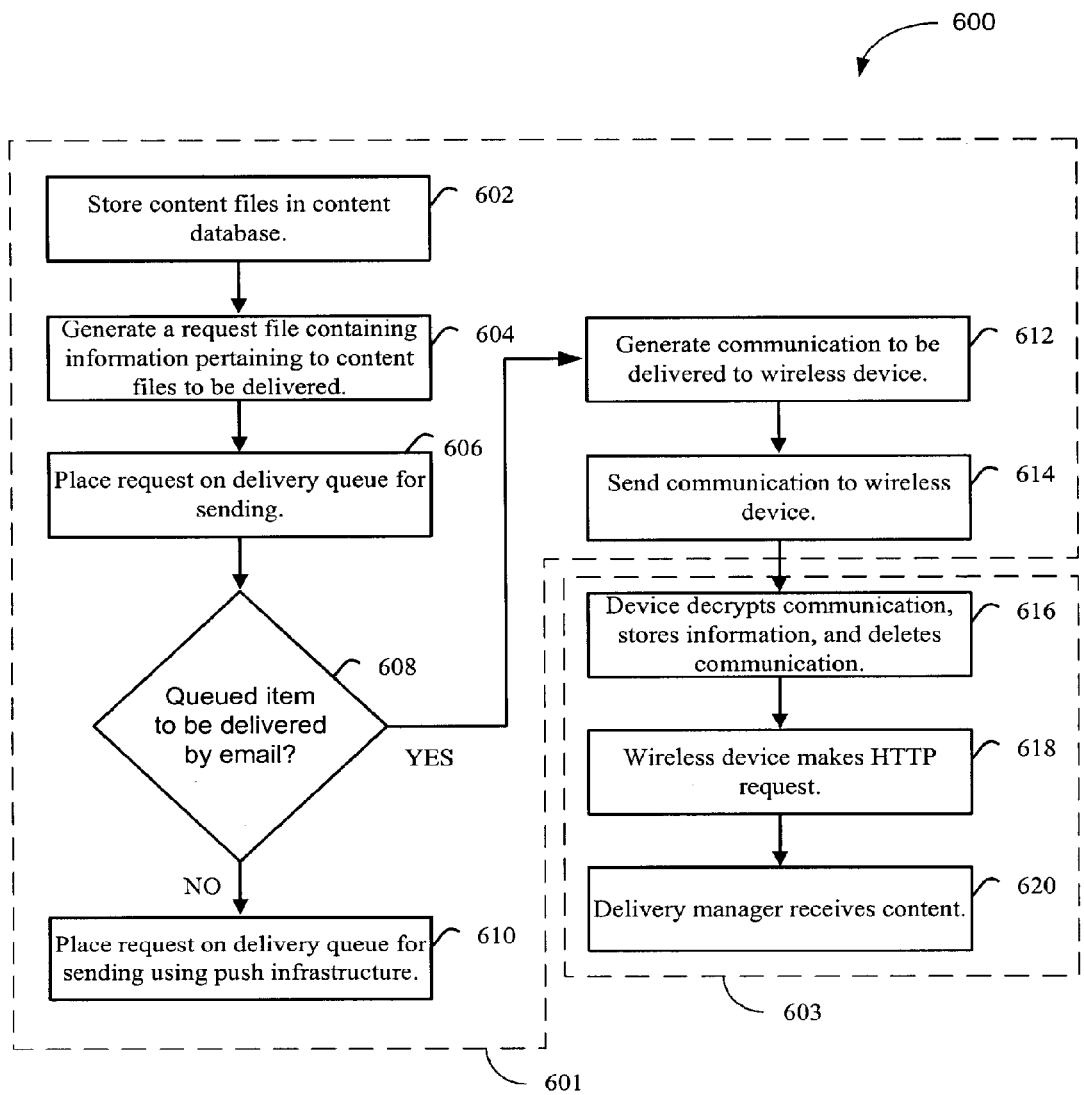
FIG. 6 shows in flowchart form a method for delivering push content to the wireless device in accordance with one embodiment.

Reference is next made to FIG. 6, which shows in flowchart form a method 600 for delivering push content to the wireless device in accordance with one aspect of the present disclosure. A first part of the method 600, indicated by reference 601, is generally implemented by components 505 and 507 shown in FIG. 5, while a second part of the method 600, indicated by reference 603, is generally implemented by the wireless device 102.

At a first block 602, content files that are to be delivered to the wireless device 102 are saved in a content database, such as the central storage device 504 or the asset library 506 as described above. This may be done by a user or administrator using, for example, the content authoring and publishing system 502. Next, at a block 604, a request file is generated containing information pertaining to the content files to be delivered to the wireless device 102, such as an identification of target wireless devices 102 to which the content files are desired to be pushed, the addresses of the content files (e.g., such that the content files may be retrieved with an HTTP request from the central storage 504), and/or whether the desired delivery method of the content files is a push infrastructure delivery or an email delivery. This may be done by a user or administrator using, for example, the content assignment and access management system 508. Next, at a block 606, a request is placed on the delivery queue (e.g., on the delivery queue 512 by the mobile content delivery system 510 using the request file) specifying the content to deliver to specific wireless devices 102.

At a block 608, the queue is inspected to see if the queued content is to be delivered by email. If the queued content is not to be delivered by email, an attempt or attempts may be made to deliver the queued content using a push delivery infrastructure at a block 610. Delivering the content by push delivery infrastructure may be preferred for non-critical deliveries or for small files or for simply delivering the request file, for which the push delivery infrastructure is better suited, assuming that the push delivery infrastructure is actually available and the target wireless device 102 is capable of receiving content over a push delivery infrastructure. If the queued items are determined at the block 608 to be delivered by email, the method 600 proceeds to a block 612 where a communication is generated, such as an encrypted email, containing the information determined at the block 604, such as identification of the target wireless devices 102, the manifest identification (ID) and/or the delivery method (e.g., HTTP request to the central storage 504). In another example, the full manifest may be included in the delivered email instead of the manifest ID.

Next, at a block 614, the communication (e.g., an email) generated at the block 612 is sent to the target wireless devices 102 through, for example the email delivery system (e.g., from the mobile connector 516 of the email server 232 shown in FIG. 2 using the system 200 to the email handler 520 shown in FIG. 5). Next, at a block 616, the wireless device 102 receives the communication. In the example of an email, the wireless device 102 decrypts the email, stores the information contained in the email in memory, and deletes the email from the inbox such that the user of the wireless device 102 need not see that the email ever arrived.

Next, at a block 618, the wireless device 102 acts on the information (e.g., commands) delivered in the email by using the manifest ID delivered in the email and retrieving the manifest, for example by HTTP request to the central storage 504, of what files the wireless device 102 is to download.

Next, at a block 620, the delivery manager 524 retrieves each of the items or files listed in the manifest, for example from the central storage 504 by HTTP request to the central storage 524, and places the received items in the wireless device 102 storage 526. Using this method, the delivery manager 524 of the wireless device 102 has control of the content download, therefore eliminating problems with push delivery such as wireless devices that are not responsive. Even if the wireless device 102 is turned off for a long period of time, once the wireless device 102 is reactivated, the delivery manager 524 can begin and/or resume download of content, therefore removing the management burden from any push delivery architecture of having to manage content push to thousands of devices, many of which may have delivery issues such as non-responsiveness at any given point in time. Push architectures are generally programmed to abandon push attempts to devices that are not responsive for a certain period of time. If the wireless device 102 is made responsible for management of the content delivery, as outlined above, this need not be the case and the infrastructure need not waste valuable processing and bandwidth resources trying to reach wireless devices 102 that are not currently available. Further, the wireless devices 102 need not suffer the eventuality that the content to be delivered is never received because the push infrastructure has given up on delivery attempts.

The embodiments of the present disclosure described above are intended to be examples only. Those of skill in the art may effect alterations, modifications and variations to the particular embodiments without departing from the intended scope of the present disclosure. In particular, selected features from one or more of the above-described embodiments may be combined to create alternative embodiments not explicitly described, features suitable for such combinations being readily apparent to persons skilled in the art. The subject matter described herein in the recited claims intends to cover and embrace all suitable changes in technology.

The invention claimed is:

1. A method for use in a system for delivering push content to a wireless device comprising:
    storing content files to be delivered to the wireless device in a central storage device of the system;
    generating a communication to be delivered to the wireless device, the communication comprising a manifest identification (ID) associated with a stored manifest file that comprises information identifying the stored content files;
    sending the communication to the wireless device;
    in response to receiving a first request from the wireless device for the manifest file, delivering the manifest file to the wireless device; and
    upon the wireless device having received the manifest file including information related to the stored content files,
        receiving a second automated request from the wireless device for the stored content files, and
        automatically delivering the stored content files to the wireless device without user action.

2. The method according to claim 1, wherein the information identifying the stored content files includes an HTTP address of each of the stored content files.

3. The method according to claim 1, further comprising generating a request file containing at least one of the manifest ID and the stored manifest file.

4. The method according to claim 3, wherein the request file includes at least one of an identification of one or more wireless devices to which the stored content files and the communication are to be delivered and a delivery method to be used for the stored content files and the communication and the communication includes at least some of the information contained in the request file.

5. The method according to claim 3, further comprising:
    placing the request file on a delivery queue of the system for sending information of the request file to the wireless device; and determining if the queued item is to be delivered by email.

6. The method according to claim 1, wherein the system includes one or more enterprise servers having storage devices.

7. The method according to claim 1, wherein the communication further includes an identification of one or more destination wireless devices.

8. The method according to claim 1, wherein the manifest ID comprises a URL pointing to a location of the stored manifest file.

9. A system for delivering push content to a wireless device comprising:
    a central storage device configured to store push content to be delivered to the wireless device;
    a push content delivery component configured to:
        generate a manifest identification (ID) associated with a stored manifest file including content to be delivered to the wireless device; and
        deliver the manifest ID to the wireless device in a communication; and
    a delivery component connected to the push content delivery component, the delivery component configured to:
        deliver the stored manifest file to the wireless device upon receipt of the manifest ID from the wireless device;
        upon the wireless device having received the manifest file including information related to the push content, automatically deliver to the wireless device the content identified in the stored manifest file upon receipt of an automated request for the content identified in the stored manifest file without user action.

10. The system according to claim 9, wherein the delivery component further comprises:

a content assignment and access management component configured to assign content to be delivered to one or more wireless devices;
a mobile content delivery component configured to handle delivery of the content to the one or more wireless devices;
a delivery queue configured to hold one or more requests for delivery;
a delivery queue web service configured to retrieve one or more queued items; and
a mobile connector configured to create and send the communication to the one or more wireless devices.

11. The system according to claim 9, wherein the stored manifest file includes an HTTP address of the content to be delivered.

12. The system according to claim 9, wherein the system include an enterprise server having the central storage device.

13. The system according to claim 9, wherein the manifest ID comprises a URL pointing to a location of the stored manifest file.

14. The system according to claim 9, wherein the delivery component is further configured to generate a request file containing at least one of the manifest ID and the stored manifest file.

15. The system according to claim 14, wherein the request file includes at least one of an identification of one or more wireless devices to which the content is to be delivered and a delivery method to be used for the content and the communication and the communication includes at least some information contained in the request file.

16. A wireless device for receiving push content, the wireless device comprising:
a memory;
a wireless communication subsystem for communication with a push content delivery system;
a processor coupled to the memory and the wireless communication subsystem;
wherein the memory has stored thereon instructions executable by the processor, wherein the instructions, when executed by the processor, provide:
a listening component configured to detect an arriving communication from the push content delivery system, the communication including a manifest identification (ID) associated with a stored manifest file located in the push content delivery system, the stored manifest file containing information identifying content to be downloaded onto the wireless device;
a handling component coupled to the listening component and configured to:
automatically process the communication,
automatically transmit a request including the manifest ID, and
automatically receive the stored manifest file, the handling component configured to automatically perform the processing, requesting, and receiving independent of user input; and
a delivery manager component configured to automatically download the content to the wireless device without user action, upon the wireless device having received the manifest file including information related to the content to be downloaded.

17. The wireless device according to claim 16, wherein the arriving communication includes an email and the handling component includes an email handler, where the processing of the communication includes decrypting the email when the email is encrypted, storing the manifest ID on the wireless device, and deleting the email.

18. The wireless device according to claim 16, wherein the transmitted request includes a transfer protocol request and the delivery manager component further transmits a transfer protocol request for requesting the content, wherein the transfer protocol request is selected from the group consisting of a hyper text transfer protocol (HTTP) request and a TCP/IP based protocol request.

19. The wireless device according to claim 16, wherein the stored manifest file received by the wireless device includes one or more HTTP addresses of one or more content files to be downloaded and the transmitted request is a HTTP request including the manifest ID of the manifest file.

20. The wireless device according to claim 16, wherein the arriving communication is received from an enterprise email server and the stored manifest file and the content are received from an enterprise server.

* * * * *